(No Model.)
G. W. LEWIN.
Register Knob.
No. 232,984. Patented Oct. 5, 1880.
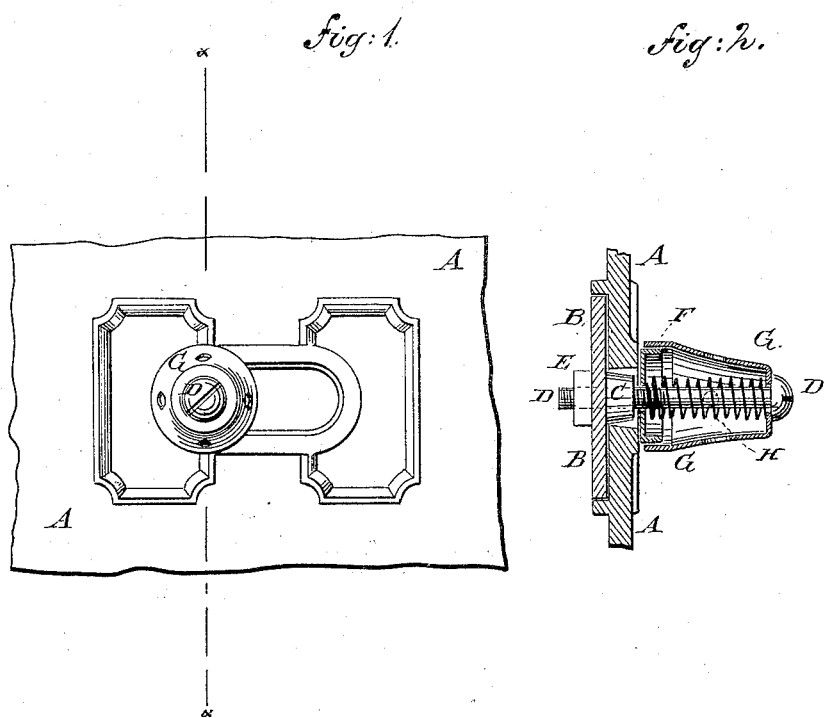
WITNESSES:
Chas. Nias
C. Sedgwick
INVENTOR:
G. W. Lewin
BY Munn & Co
ATTORNEYS.

UNITED STATES PATENT OFFICE.

GEORGE W. LEWIN, OF SOMERSET, (FALL RIVER P. O.,) MASSACHUSETTS.

REGISTER-KNOB.

SPECIFICATION forming part of Letters Patent No. 232,984, dated October 5, 1880.

Application filed March 9, 1880. (No model.)

*To all whom it may concern:*

Be it known that I, GEORGE WASHINGTON LEWIN, of Somerset, (Fall River P. O.,) in the county of Bristol and State of Massachusetts, have invented a new and useful Improvement in Register-Knobs, of which the following is a specification.

Figure 1 is a front elevation of the improvement. Fig. 2 is a sectional elevation taken through the line $x$ $x$, Fig. 1.

The object of this invention is to furnish register-knobs so constructed that they cannot be clogged with stove-polish, will admit air to the spring to prevent the said spring from becoming unduly heated, and which will readily adjust itself to any inequalities in its seat.

The invention consists of a slide having a boss, in combination with a register-knob having a perforate shell, spring, and flanged washer, all held together by a screw and nut, as hereinafter described.

A represents the plate of the register, and B is the slide or damper. Upon the outer side of the slide B is formed a boss, C, which projects through the slot in the plate A, and through which and the slide B is formed a hole to receive the screw D, so as to form a long bearing for the said screw. The screw D is held in place by a nut, E, screwed upon its inner end.

Upon the screw D, at the outer side of the plate A, is placed a washer, F, which is formed of a disk of sheet metal having an outwardly-projecting ring-flange around its outer edge.

Upon the screw D, at the outer side of the plate A, is also placed the knob-shell G.

The shell G is made of sheet metal with a cylindrical inner part to receive and fit and slide upon the flanged edge of the washer F, and with a hole in its flat outer end to receive the screw D, the head of the said screw resting against the said flattened end.

The middle and outer parts of the knob-shell G may be tapered, or tapered and concaved, or otherwise shaped to give it a neat appearance.

In the knob-shell G are formed a number of holes for the passage of air to keep the shell and spiral spring H placed within it from becoming unduly heated.

The spiral spring H is placed upon the screw D with its forward end resting against the washer F, and its outer end resting against the flattened outer end of the knob-shell G.

With this construction the washer F is pressed inward to take up the wear by the spring H, which spring also allows the washer F to move outward to adjust itself to any unevenness in the knob-seat.

With this construction, also, the knob cannot be clogged by stove-polish, as any polish that may adhere to the flange of the washer F will be pushed off by the edge of the knob-shell G.

With this construction, also, should the knob be accidentally bent the washer will still slide easily, as the said washer will stay down to its place without regard to the angle of the upper part of the knob.

With this construction, also, the spring can be made long, so as to have an even tension.

I am aware that a stove-door knob has been made in sections and the joint afterward made solid; but this is without a spring and inapplicable to a register.

My invention is an improvement upon the White and Lewin knob. In opening and closing a register with this knob, the propelling-point being at top and the bottom being loose, the latter tips and wedges between the head and part on which it slides. This knob also has a cast-iron washer with a small hole for the screw and spring, while I have a flat washer detached from body and placed at the base of knob, so as not to turn either edge up or down, but to remain true, even if the knob has been put on aslant.

What I claim is—

In a knob-register, the combination, with a slide, B, having the boss C, of the screw and nut D E, the flat washer F, the shell G, and the spring H, as shown and described.

GEORGE W. LEWIN.

Witnesses:
ANDREW J. JENNINGS,
JAMES M. MORTON, Jr.